United States Patent

Channing

[15] 3,638,108

[45] Jan. 25, 1972

[54] METHOD OF TESTING AN AUTOMOBILE BATTERY AND ELECTRICAL SYSTEM WHILE IN CIRCUIT, USING A BOOSTER BATTERY

[72] Inventor: Harry M. Channing, Reading, Pa.
[73] Assignee: General Battery and Ceramic Corp., Reading, Pa.
[22] Filed: Apr. 28, 1969
[21] Appl. No.: 819,650

Related U.S. Application Data

[63] Continuation-in-part of Ser. No. 578,727, Sept. 12, 1966, abandoned.

[52] U.S. Cl. ............................324/29.5, 73/118, 324/73
[51] Int. Cl. .....................................................G01n 27/42
[58] Field of Search ..............324/29.5, 16, 73, 15; 340/249; 73/118

[56] References Cited

UNITED STATES PATENTS

| | | | |
|---|---|---|---|
| 1,993,444 | 3/1935 | Haskins | 324/29.5 |
| 2,229,009 | 1/1941 | Berry | 324/29.5 |
| 2,780,777 | 2/1957 | Sammis et al. | 324/29.5 |
| 3,356,935 | 12/1967 | Morgan | 324/16 |

*Primary Examiner*—Rudolph V. Rolinec
*Assistant Examiner*—R. J. Corcoran
*Attorney*—Schapp and Hatch

[57] ABSTRACT

A combination booster and automobile electrical system tester, including a booster battery, polarity protector, voltmeter, remote control switch, operational indicator lights and interconnecting cables all mounted on a handtruck-type cart with a detachable handle, for making comparison tests of the voltages present in an automobile electrical system with and without the starter cranking and with and without the booster battery connected.

5 Claims, 2 Drawing Figures

PATENTED JAN 25 1972 3,638,108

INVENTOR.
HARRY M. CHANNING
BY
*Schapp & Hatch*
ATTORNEYS

METHOD OF TESTING AN AUTOMOBILE BATTERY AND ELECTRICAL SYSTEM WHILE IN CIRCUIT, USING A BOOSTER BATTERY

CROSS-REFERENCES TO RELATED APPLICATIONS

This application is a continuation-in-part of my copending application Ser. No. 578,727, filed Sept. 12, 1966, and entitled TESTING AND BOOSTER POWER SUPPLY UNIT now abandoned.

BACKGROUND OF THE INVENTION

The present invention relates to improvements in a method of comparison testing, and more particularly to a test method selectively substituting a booster battery in an automobile electrical system while protecting against damaging such system because of incorrect hookup.

With the increased use of batteries with one-piece covers, where it is no longer possible to test individual cells, it has been necessary to develop new battery-testing equipment. The need for new equipment in this field has been given further impetus by the addition to modern cars of more power-consuming accessories, and by the trend toward use of alternators rather than conventional direct current generators for supplying the electrical power. Furthermore, the ever-increasing numbers of automobiles on the road has accelerated the demand for rapid and yet accurate trouble-shooting and servicing of the problems of the electrical systems of those automobiles by people of less skill than a journeyman mechanic, such as by service station attendants or emergency road service technicians.

Some of the simplest and yet most valuable tests of an automobile electrical system may be obtained with the apparatus of the present invention, which enables the operator to measure the voltage in the automobile electrical system using the automobile's own battery, both with the starter cranking and without, and which also enables the operator to make the same two tests with a freshly charged high-capacity booster battery connected to the electrical system of the automobile. Problems have arisen, however, with equipment permitting direct connection of the booster battery to the automobile electrical system in the case of automobiles which have alternator-type electrical systems, as alternator-type systems may be severely damaged if the booster battery is hooked up with polarity reverse to that of the automobile electrical system. Improper polarity of connection may also damage other electrical accessories of the automobile such as transistorized ignition systems, radios, and tape players.

SUMMARY OF THE INVENTION

To prevent such damage, it is essential to equip booster battery sets with a polarity-sensing device which prevents electrical connection of the booster battery to the automobile electrical system unless the polarity of the electrical system is the same as that of the booster battery, that is to say, unless the operator has attached the connecting cables of the testing apparatus in proper polarity relationship to the poles of the automobile electrical system. A further advantage of such a polarity protector which prevents completion of the circuit between the booster battery and the cables which attach the test apparatus to the automobile electrical system until such time as the polarity protector senses the appropriate polarity is that the clips on those cables are thereby kept deenergized until they are properly attached so that the booster battery is not shorted out by accidental contact of the clips with each other or with a common conductor. This yields the dual benefit of preventing dissipation of the charge of the booster battery through such accidents and the safety of preventing potentially hazardous sparking through such short-circuiting. Sparks are a particular danger around freshly and rapidly charged batteries, as hydrogen gas may be evolved in the rapid charging process, which could explode upon ignition by an accidental spark.

As the present apparatus is designed for "in the field" use as well as use in regular full-service repair establishments, a highly desirable compact and readily portable unit is provided. The equipment ideally is combined into one integral unit which can easily be rolled around from automobile to automobile and which facilitates loading of the apparatus into a wide variety of vehicles which might be used to render emergency road service to stalled cars. Accordingly, all of the electrical components of the present apparatus are mounted on a cart of the handtruck type, with a handle on the cart so that it may be conveniently wheeled along by a man walking with it. To increase the compactness and ease of handling of the apparatus, in the preferred embodiment of applicant's invention, a portion of the handle is made demountable from the lower portion of the cart so that the apparatus may be inserted into or through a space with limited vertical clearance. Making an integral unit of the apparatus by mounting all of its cooperative components on the cart assures that no part of the apparatus will become separated from the rest and left behind, and provides further assurance that a careless user of the apparatus will not misconnect the booster battery to the polarity protector or use the booster battery with ordinary jumper cables lacking polarity protection.

The testing apparatus of the present invention is intended both for diagnostic use by service personnel working on the automobile and for direct demonstration of the condition of the electrical system of the automobile to the owner by service personnel. For such demonstration usage, it is advantageous to have simple and straight-forward appearing apparatus which the owner can observe while the testing takes place. This is facilitated by the unitary nature of applicant's testing apparatus.

It is therefore a principal object of the present invention to provide a unitary testing and booster power supply apparatus adapted both to start stalled automobiles and to test automobile electrical systems.

It is a further principal object of the present invention to provide testing apparatus of the character described in which the automobile electrical system is protected against imposition of direct current of polarity reverse to the proper system polarity.

Another object of the present invention is to provide electrical testing apparatus of the character described adapted for attachment to the electrical system of an automobile to measure the voltage present in that system under selected load conditions and with selected sources of power supply.

A further object of the present invention is to provide a testing and booster power supply unit of the character described in which graphic indication is given of correct or incorrect hookup to the automobile electrical system and of whether or not the booster battery is operatively connected into the automobile electrical system.

A still further object of the present invention is to provide an electrical testing and booster supply unit in which the booster power supply is connected into the automobile electrical system by remote control means allowing the user of the testing apparatus maximum free movement and eliminating the potential hazard of sparking near batteries.

Yet another object of the present invention is to provide an electrical testing unit of the character described in which the cables for connecting the unit to the electrical system are kept out of connection with the booster power source until after connection to the automobile electrical system to prevent discharge and damage to the booster power source and to prevent potentially hazardous sparking in the vicinity of the automobile's battery.

Further objects and advantages of the invention will appear as the specification proceeds, and the new and useful features of the testing and booster power supply unit will be fully defined in the claims hereto attached.

BRIEF DESCRIPTION OF THE DRAWING

The preferred form of the invention is illustrated in the accompanying drawing forming a part of this application, in which.

DESCRIPTION OF THE PREFERRED EMBODIMENTS

Figure 1:
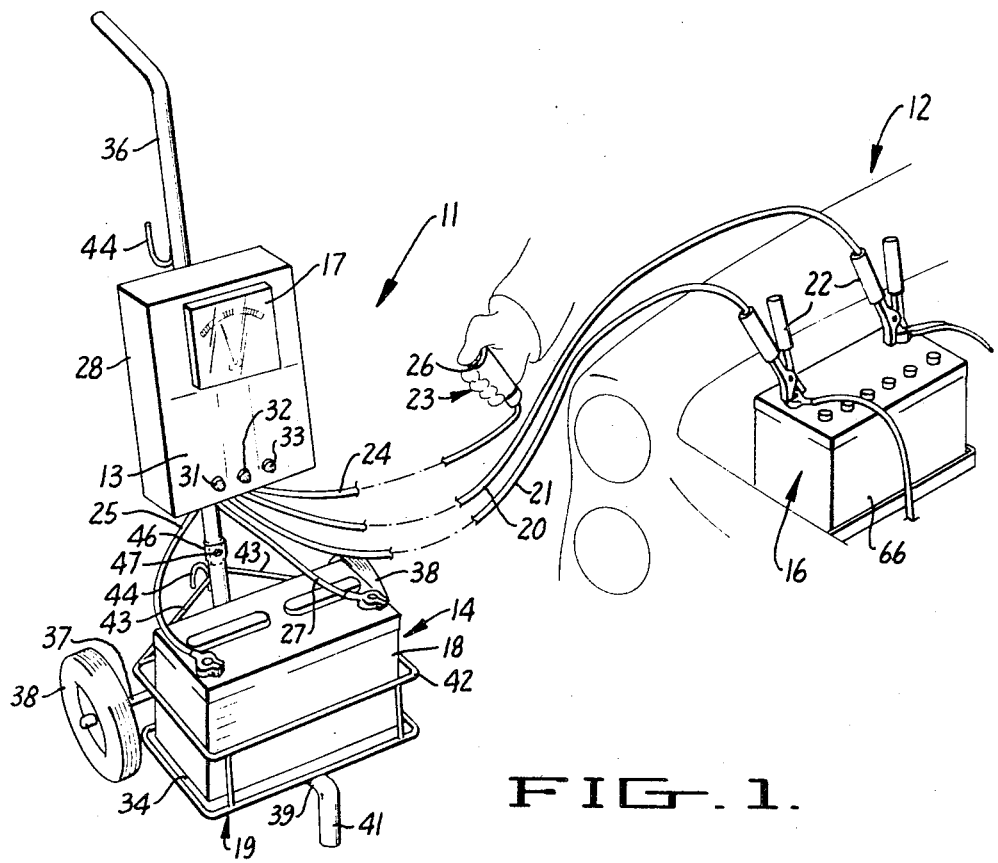
FIG. 1 is a perspective view of the testing and booster power supply unit of the present invention operatively connected to the electrical system of an automobile.

Referring to the drawings in detail, it will be seen that the testing and booster power supply unit 11 of the present invention essentially comprises a polarity protector 13 adapted for connection to a source of direct current 14 and to the electrical system 16 of an automobile 12, together with a test meter 17 connected to polarity protector 13 for measuring the voltage present in electrical system 16. Polarity protector 13 is formed to control operative electrical connection of the source of direct current 14 to the automobile electrical system 16 in response to the polarity of the latter.

In the preferred form of applicant's invention, as shown in these drawings, the source of direct current 14 is a conventional 12-volt automobile storage battery 18 of high ampere-hour capacity, and booster battery 18, the polarity protector 13, and the test meter 17 are mounted on a handtruck-type wheeled cart 19 to provide a unitary, compact and readily transportable testing and booster power supply unit.

Polarity protector 13 is equipped with connecting cables 20 and 21 having conventional clips 22 attached thereto for connecting cables 20 and 21, and thereby polarity protector 13, to electrical system 16 of automobile 12. A remote control means 23 is connected to polarity protector 13 and consists of remote control switch 26 coupled to polarity protector 13 by a cable 24. As may be seen from FIG. 2, remote control means 23 is in a series operational relationship with polarity protector 13 so that concurrent closure of remote control switch 26 and sensing of correct polarity of electrical system 16 by polarity protector 13 is required before booster battery 18 will be connected into electrical system 16. Cables 25 and 27 are also provided to connect booster battery 18 to the circuitry of polarity protector 13.

Test meter 17 may be a conventional volt meter of appropriate voltage range with a scale calibrated to indicate satisfactory and unsatisfactory ranges of voltage present in system 16 under the varying load and power supply conditions under which the tests are made. As here shown, test meter 17 is built into a housing 28 attached to cart 19, but it should be appreciated that the test meter 17 could be enclosed in a separate housing readily removable from cart 19 and supplied with appropriate clip leads (not shown) to allow removable connection of test meter 17 to the circuit of polarity protector 13.

Mounted in housing 28 and connected into the circuit 29 of polarity protector 13 are indicators 31, 32 and 33 for indicating correct and incorrect connection of testing apparatus 11 to electrical system 16 and for indicating operative connection of booster battery 18 to system 16. In the preferred form of the invention shown here, indicators 31, 32 and 33 are small indicator lamps of appropriate voltage rating, with indicator 31 being colored red, indicator 32 being colored green, and indicator 33 being colored yellow for the greatest ease of visual distinction between them. Red indicator 31 denotes improper connection to system 16, green indicator 32 denotes proper connection to system 16, and yellow indicator 33 indicates the operative electrical connection of booster battery 18 into automobile electrical system 16.

Cart 19 is formed with a platform 34 having a handle portion 36 projecting upwardly therefrom for maneuvering the cart and for supporting housing 28 which contains polarity protector 13 and meter 17. Attached to platform 34 and handle portion 36 is an axle 37 on which are mounted for rotation wheels 38 for assisting in the movement of the apparatus. As here shown, cart 19 is formed with handle portion 36 having a portion 39 thereof extending generally horizontally beneath platform 34 to support the platform and then being bent downwardly to form a leg 41 to provide a third point of support for the apparatus. Cart 19 is also provided with a railing 42 surrounding platform 34 to assist in retaining booster battery 18 thereon. Brace members 43 extend from railing 42 to handle portion 36 to reinforce railing 42 and platform 34. Handle 36 is provided with hooks 44 for convenient storage of cables 20, 21 and 24.

The upper portion of handle 36 is detachable from the lower portion of the handle by means of a telescoped joint 46 preferably located above the point of attachment of brace members 43 to handle 36 and below the point of attachment of housing 28. Joint 46 may be secured against accidental disengagement by a screw 47, or by other appropriate means such as a spring-loaded ball latch. Making the upper portion of handle 36 demountable at joint 46 allows the user to remove the upper portion of the apparatus, including housing 28, to render the apparatus more compact for transportation in a space of limited clearance. The apparatus may then be easily and quickly reassembled and used or wheeled around in its assembled form at any convenient location, as desired.

Figure 2:
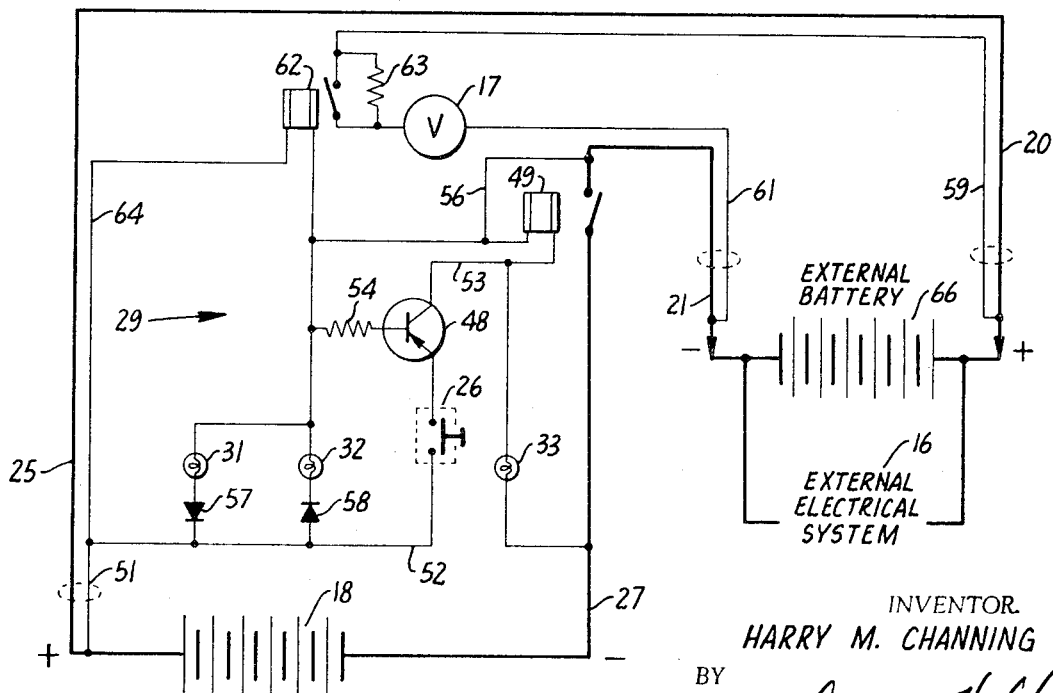
FIG. 2 is a schematic diagram of the electrical circuit of the unit of FIG. 1 shown connected to the automobile battery and electrical system.

In the electrical circuit of the testing apparatus, as shown in FIG. 2, a transistor 48 acts as a switching device to operate a heavy-duty relay 49 which in turn, upon its closure, connects booster battery 18 into the automobile electrical system 16. Transistor 48 may be of any type having the appropriate power-handling characteristics but should be of sufficient rating to pass the amount of current required to energize relay 49. In the preferred form of the present invention, transistor type 2N555, manufactured by Motorola, is used. This transistor is a PNP-transistor but an NPN-transistor could be used with the well-understood reversal of the polarity of its connections.

The positive pole of booster battery 18 is connected to a heavy gauge power cable 25 which for reasons of convenience passes into and through housing 28, exiting from housing 28 as positive connecting cable 20 and continuing therefrom to one of connector clips 22 attached to a positive pole in the electrical system 16 of automobile 12. The negative pole of booster battery 18 is connected to a cable 27 leading into housing 28 and connecting therein to one contact of relay 49. The other contact of relay 49 is connected to a heavy gauge connecting cable 21 which exits from housing 28 and leads to the other of connecting clips 22 which is connected to a point of negative polarity in the electrical system 16 of automobile 12. Contained within the outer covering of cable 25 but insulated from contact therewith is a lead 51 which enters housing 28 with cable 25 but then separates from that cable.

The emitter of transistor 48 is connected in series with remote control switch 26 in a lead 52 which connects with lead 51. The collector of transistor 48 is connected through lead 53 to one terminal of the energizing coil of relay 49. Indicator 33 is connected between lead 53 and cable 27. The base of transistor 48 is connected through base resistor 54 to a lead 56 which is common to one terminal of indicators 31 and 32 and is also connector to the other terminal of the energizing coil of relay 49 and to cable 21. In the preferred form of this invention, base resistor 54 is of the value of 100 ohms, but it should be appreciated that if other transistors are chosen than the one here used, the appropriate value of base resistor 54 should be selected in accordance with the characteristics of the transistor used.

As mentioned above, one terminal each of indicators 31 and 32 is connected to lead 56 which leads in turn to cable 21. The other lead of indicator 31 is connected to the anode of a diode 57, and the cathode of diode 57 is connected to lead 52. The other terminal of indicator 32 is connected to the cathode of a diode 58, and the anode of that diode is connected to lead 52.

Leads 59 and 61 are contained within cables 20 and 21, respectively, in a fashion similar to the inclusion of lead 51 in cable 25. Lead 61 is connected directly to one terminal of test meter 17. Lead 59 is connected to one of the switch contacts of a relay 62. The other switch contact of relay 62 is connected to the other terminal of test meter 17. Connected across the switch contacts of relay 62 is a series resistance 63 for test meter 17. The switch contacts of relay 62 are of the normally closed variety so that upon energization of the coil of relay 62 with the appropriate current, the switch contacts will be opened to place series resistance 63 into the test meter circuit, while in the absence of sufficient energization of relay 62, series resistance 63 is shorted out by the closed switch contacts of relay 62.

One terminal of the energizing coil of relay 62 is connected to lead 56, and the other terminal of the energizing coil of relay 62 is connected through a lead 64 to lead 51. Test meter 17, series resistance 63 and relay 62 are available as a single packaged commercial unit from the Christie Electric Corporation of Los Angeles, Calif., in a unit designated as the Christie T-2 Tester. The test meter has a range of approximately 7.5 volts DC full scale, and series resistance 63 is preferred to be of the order of 2,940 ohms. It should be appreciated, however, that if other meters than the one contained in the Christie T-2 unit are used as test meter 17, the value of series resistance 63 should be appropriately selected to match the characteristics of the meter used for the purpose of converting the meter to approximately double the scale reading, or 15 volts DC full scale. Relay 62 is selected to have a "pull in" potential somewhat less than 12 volts DC and considerably greater than 6 volts DC, such as 9 or 10 volts DC As here shown, relay 62 may be a type 2X1A3C1, 12-volt DC coil, as manufactured by Globe Electric Manufacturing Company, Gardena, Calif.

In operation, relay 62 and series resistance 63 operate to automatically convert test meter 17 for use with 6 or 12 volt electrical systems in automobile 12. Upon connection of cables 20 and 21 to electrical system 16, if the system is 6 volt, the 6-volt potential will not be enough to energize the coil of relay 62, along the circuit consisting of cable 20 leading from the positive pole of electrical system 16 to the positive pole of booster battery 18 and thence along lead 51 and 64 to the coil of relay 62 and from the negative pole of electrical system 16 along cable 21 to lead 56 and thence to the other terminal of the energizing coil of relay 62. Thus, the contacts of relay 62 will remain closed, shorting series resistance 63 out of the meter circuit, and resulting in 6-volt operating characteristics of test meter 17. Should electrical system 16 be of the 12 volt variety, the potential applied along the above circuit to the energizing coil of relay 62 will be sufficient to cause its actuation, opening its switch contacts, and placing series resistance 63 into the meter circuit, converting the test meter 17 for 12-volt operation.

In the overall operation of the testing apparatus for diagnostic purposes, the apparatus is wheeled up on cart 19 to a position such that the electrical system 16 of automobile 12 is accessible to cables 20 and 21 and yet meter 17 and indicators 31, 32 and 33 are readily visible to the service operator and to the customer. The service operator attaches clips 22 to the electrical system 16 of automobile 12 at a convenient point which may be the terminals of the customer's battery 66.

Should the service operator by mistake apply cable 21 to the positive pole of the customer's battery and cable 20 to the negative pole, two effects may be noted. The first of these is that a positive potential will be applied to the anode of diode 57 through cable 21 and lead 56 and a negative potential will be applied to the cathode of diode 57 through cables 20 and 25 and lead 51. Diode 57 will then conduct current, lighting indicator lamp 31 indicating improper polarity of connection of clips 22 to electrical system 16.

The second effect to be noted is that should the service operator close remote control switch 26 despite the improper connection to electrical system 16, a positive potential will be applied through base resistor 54 to the base of transistor 48, biasing transistor 48 toward cutoff. As transistor 48 is cut off, electrons do not flow from the lead 52 through the emitter to the collector and thence to lead 53 to energize the coil of relay 49. It is therefore not possible, even after closure of remote control switch 26, to cause booster battery 18 to be connected to automobile electrical system 16 if clips 22 have been applied to the wrong poles of system 16. Red indicator lamp 31 thus serves to warn the service operator of his error and of the reason why the testing apparatus remains inoperative, and also warns him to correct the polarity of connection of clips 22 to electrical system 16 in order to prevent damage to test meter 17 through prolonged connection to a source of the wrong polarity of current.

With cables 20 and 21 incorrectly connected, green indicator lamp 32 will not be lit, as current flow between line 56 and line 52 is blocked by diode 58 through the application of positive potential to the cathode of that diode and application of negative potential to the anode of that diode. Yellow indicator lamp 33 will likewise not be energized, as the circuit between lines 52 and 53 is interrupted by transistor 48 which is biased to cut off.

If clips 22 are applied correctly to electrical system 16 to connect cable 20 to the positive pole of the electrical system 16 and cable 21 to the negative pole, two effects may be noted. The first effect is that through application of negative potential to the cathode of diode 58 and to the anode of diode 57 along lead 56, together with application of positive potential to the anode of diode 58 and to the cathode of diode 57 along lines 52, 51, cable 25, and cable 20, diode 58 will conduct current and diode 57 will block the flow of current so that indicator lamp 31 will not be lit, but indicator lamp 32 will be lit to indicate the correct polarity of connection of clips 22 to automobile electrical system 16.

The second effect to be noted is that a negative potential will be applied along lead 56 to the base of transistor 48 through base resistor 54. Upon closure of remote control switch 26, a negative bias will be supplied to the base of transistor 48, biasing it toward saturation. Transistor 48 will then pass current between line 52 and line 53 to energize the coil of relay 49, thereby closing the switch contacts of relay 49 to connect booster battery 18 to the electrical system 16 of automobile 12. The passage of current between lines 52 and 53 due to conduction by transistor 48 also lights yellow indicator lamp 33 to indicate that the booster battery 18 has been operatively connected into automobile electrical system 16.

The diagnostic procedure for the testing apparatus may be conducted as follows: the service operator, after making the correct connection of clips 22 to electrical system 16, can read for his own diagnostic use and can demonstrate to the customer the voltage indicated on test meter 17, which will be an indication of the state of charge of the customer's battery 66. If the automobile 12 has been operated recently, it may be necessary to disconnect the coil wire of automobile 12 to prevent the engine from starting and to operate the starter of automobile 12 for a few seconds to dissipate any surface charge on battery 66 which might distort the readings by test meter 17.

After the service operator has measured the voltage level of the customer's battery 66 under no load conditions, the starter of automobile 12 may be operated to place the customer's battery 66 under heavy load conditions. Test meter 17 will again indicate the voltage in electrical system 16 to inform the service operator and demonstrate to the customer the ability of the customer's battery 66 to perform under load conditions. This test gives an indication of the overall condition of the customer's battery 66, and of its ability to be recharged.

If both of the above tests result in satisfactory voltage readings on test meter 17, the customer may be assured that his battery 66 is in good condition. Should the customer's battery 66 perform unsatisfactorily according to the readings of test meter 17 under load conditions, the service operator may substitute the booster battery 18 into the circuit in parallel with the customer's battery 66 by closure of remote control switch 26 to compare the performance of electrical system 16 when supplied with power by booster battery 18 with the performance when supplied by the customer's battery 66. Yellow indicator 33 serves as a guide to the interpretation of the readings of test meter 17 by indicating whether the electrical system 16 is being evaluated with the booster battery 18 connected to it, or without the booster battery.

Should test meter 17 indicate satisfactory voltage readings under load with the booster battery 18 connected into the electrical system 16, the problems of electrical system 16 are thereby vividly demonstrated to lie with the customer's battery 66. Should the readings of test meter 17 under heavy load, i.e., with the starter cranking, remain unsatisfactory after booster battery 18 is connected into electrical system 16, one of the connecting cables to the customer's battery 66 may be removed from the customer's battery and the corresponding clip 22 connected directly to the connecting cable to isolate the customer's battery 66 from electrical system 16. If the readings of test meter 17, under load, with the starter cranking, remain unsatisfactory after the customer's battery 66 is thereby removed from the system, the problems of electrical system 16 are demonstrated to lie either with the starter or connecting cables of electrical system 16 of automobile 12.

During all of the foregoing tests under load with the starter of automobile 12 cranking, the coil wire of automobile 12 has been disconnected to prevent the operation of the starter from starting the engine. To continue the diagnostic evaluation of electrical system 16, the coil wire may be reconnected and the starter of automobile 12 permitted to start the engine. With the engine of automobile 12 running and clips 22 still connected to electrical system 16, test meter 17 should indicate the voltage output of the generator or alternator system of the automobile. For example, too low voltage might indicate a defect in the generator, while too high a voltage might indicate improper operation of the voltage regulator.

Should the customer's battery 66 be so dead as to be unable to produce any negative potential upon application of clip 22 to its negative pole so as to bias transistor 48 toward saturation, the service operator may override this polarity protective feature of the testing apparatus by touching the clip 22 which is attached to cable 21 to the negative pole of the booster battery 18 while holding remote control switch 26 closed. This will apply the necessary negative bias to transistor 48 to cause it to conduct, thereby energizing relay 49 to close its switch contact and supply the negative bias from the negative pole of the booster battery along line 56 to the base of transistor 48 to keep transistor 48 in the saturation mode. The service operator then holds remote control switch 26 closed continuously while he removes clip 22 bearing cable 21 from the negative terminal of booster battery 18 and, after carefully ascertaining the negative pole of electrical system 16, applies cable 21 to that pole.

Great care must be exercised to select the correct pole of automobile electrical system 16, as the polarity protection apparatus of the testing apparatus has been bypassed and severe damage may be done to electrical system 16 if the improper polarity is imposed upon it by this technique. However, the use of this technique enables the service operator to use the booster battery to start automobile 12 if it is stalled by a completely dead battery 66 and to evaluate the starter, cables, generator, voltage regulator or alternator of automobile 12, as outlined above. If the clip 22 bearing cable 21 is applied to the negative terminal of booster battery 18 without closure of remote control switch 26, test meter 17 may thereby be used to measure the state of charge of booster battery 18 to ensure that it is fully charged.

The testing apparatus may also be used to perform the normal function of a booster battery in starting the engines of automobiles whose own batteries are dead. This use may or may not be accompanied by the use of the further capabilities of the testing apparatus to diagnose and demonstrate the source of problem in the electrical system of a customer's car. For this purpose, test meter 17 is not necessary, but the remainder of the apparatus forms a convenient unit for transporting the booster battery 18 and the polarity protector 13 together with the indicators 31, 32 and 33 and the necessary connector cables, which serve to apply booster power to automobile 12 and to protect, as outlined above, against improper connection of clips 22 to the electrical system 16.

For emergency roadside service to stalled automobiles and for other general convenience in transporting the apparatus, the operator may, if necessary, demount the upper portion of handle 36 carrying housing 28 and cables 20, 21 and 24 at telescoping joint 46. This enables the user of the testing apparatus to carry the apparatus around in a space of limited vertical clearance such as the trunk of an automobile and yet allow booster battery 18 to remain upright to protect against spillage of battery acid. The hooks 44 provided on handle 36 allow cables 20, 21 and 24 to be conveniently and attractively wound up out of the way when not in use.

Clips may be stored by clamping them to any convenient part of the framework of cart 19, such as brace members 43 or axle 37, even though those parts may be of conductive material, as the clips 22 remain deenergized until such time as remote control switch 26 is closed concurrently with application of a source of negative potential to cable 21. As explosive hydrogen gas may be present in the vicinity of a freshly charged battery, the lack of application of potential to clips 22 yields an advantageous safety feature of preventing hazardous sparking should clips 22 short together or against a common conductor.

The provision of the remote control means 23 which allows the operator to step back a safe distance before electrically engaging the booster battery with the automobile electrical system 16 has a further safety advantage should a defect in system 16 be such as to cause hazardous sparking upon application of one of clips 22 to electrical system 16. The remote control means 23 also allows the operator to make the tests outlined above from a convenient position, such as alongside the customer if he is demonstrating the test to a customer, or near the starter switch of the automobile if he is testing the automobile by himself. The booster battery will not be shorted out by careless operation of remote control means 23, as the booster battery is kept out of connection by polarity protector 13 until proper polarity is sensed.

From the foregoing, it will be seen that the present invention provides a novel and useful testing and booster power supply unit effective to measure the voltage present in the automobile electrical system under selected conditions of no load and heavy load and with a choice of sources of power supply, such as the customer's battery or a booster battery. The unit protects the electrical system of the automobile from the imposition of incorrect polarity direct current and gives graphic indication of correct and incorrect hookup and of whether or not the booster battery power source is being used. For both safety and ease of demonstration, the unit has been provided with a remote control means and the connecting cables connecting to the customer's automobile electrical system as kept deenergized until correct polarity is sensed and the remote control means is operated. The unit provided may also be seen to be adaptable both for the starting of stalled automobiles through application of booster power thereto and for diagnosing the source of electrical faults in the automobile electrical system.

I claim:

1. A method of evaluating performance of a specific battery in a specific automobile electrical system and ascertaining the electrical condition thereof, comprising the steps of connecting a voltmeter across the automobile's battery terminals while the latter are connected to the automobile electrical system to measure voltage thereacross, operating the automobile starter to crank the engine while preventing starting of the engine to measure voltage thereacross under starting load, connecting a fully charged high ampere-hour booster battery to the automobile electrical system in parallel with the automobile's battery, and operating the automobile starter to crank the engine while preventing starting of the engine to measure voltage across the terminals of the automobile's battery for comparison of voltage in the automobile electrical system under cranking load with and without said booster battery, whereby if said electrical system is in a first condition wherein the voltage is below a standard value with only the automobile's battery connected to the automobile electrical system while under cranking load and is above said standard value when the booster battery is connected to the automobile electrical system in parallel with the automobile's battery while under cranking load the automobile's battery is at fault, and whereby if said electrical system is in a second condition wherein the voltage is below said standard value when the booster battery is connected to the automobile electrical system in parallel with the automobile's battery while under cranking load the automobile's starter system is at fault.

2. A method as described in claim 1, and wherein in the event said electrical system is in said first condition said method comprises the additional steps of connecting a voltmeter across the automobile's battery terminals while the latter are connected to the automobile electrical system to measure voltage thereacross under no cranking load conditions with the engine stopped, starting the engine of the automobile and measuring the voltage across said terminals with the engine running, whereby if said electrical system is in a third condition wherein the measured voltage under no cranking load conditions with the engine stopped is below a first standard value the automobile's battery is discharged, and whereby if said electrical system is in a fourth condition wherein the measured voltage with the engine running is below a first standard value the generator is at fault and if said electrical system is in a fifth condition wherein the measured voltage with the engine running is above a second higher value the voltage regulator is at fault.

3. A method as described in claim 1, and wherein in the event said electrical system is in said second condition said method comprises the additional steps of connecting a voltmeter across the automobile's battery terminals while the latter are connected to the automobile electrical system to measure voltage thereacross with said booster battery connected in parallel and the engine stopped and the starter not cranking, whereby if said electrical system is in a sixth condition wherein the measured voltage is below a standard value a short circuit is indicated in the electrical system outside the ignition and starter portions of the system.

4. A method as described in claim 1, and wherein in the event said electrical system is in said second condition said method comprises the additional steps of connecting a voltmeter across the automobile's battery terminals while the latter are connected to the automobile electrical system to measure voltage thereacross with said booster battery connected in parallel and the engine not running and the starter cranking, whereby if said electrical system is in a seventh condition wherein the measured voltage is below a standard value a fault in the starter system is confirmed, and whereby if said electrical system is in an eighth condition wherein the measured voltage is above said last named standard value a fault in the automobile's battery is confirmed.

5. A method as described in claim 2, and wherein in the event said electrical system is in said fourth condition and not in said eighth condition said method comprises the additional steps of measuring the voltage across the booster battery terminals while the latter are connected to the automobile electric system to measure voltage thereacross with the engine running and the automobile battery disconnected from the automobile electrical system, whereby if the measured voltage is below a standard value the generator is at fault and if the measured voltage is above a standard value the automobile's battery is discharged.

* * * * *